United States Patent
Lee

(10) Patent No.: US 7,364,183 B2
(45) Date of Patent: Apr. 29, 2008

(54) SEAT ROTATING DEVICE FOR BABY STROLLERS

(76) Inventor: Tsung-Daw Lee, P.O. Box 44-2049, Taipei (TW) 10668

( * ) Notice: Subject to any disclaimer, the term of this patent is extended or adjusted under 35 U.S.C. 154(b) by 97 days.

(21) Appl. No.: 11/486,013

(22) Filed: Jul. 14, 2006

(65) Prior Publication Data

US 2008/0012268 A1 Jan. 17, 2008

(51) Int. Cl.
 *B62B 7/00* (2006.01)
 *B62B 3/00* (2006.01)
 *B62B 1/00* (2006.01)
 *A47C 1/00* (2006.01)

(52) U.S. Cl. ........... 280/642; 280/47.35; 280/47.38; 280/47.39; 280/47.4; 280/47.41; 280/47.34; 280/42; 280/647; 280/648; 280/649; 280/650; 280/657; 280/658; 297/344.21; 297/344.22

(58) Field of Classification Search ........ 280/642–643, 280/647–650, 42, 657, 658, 47.35, 47.38, 280/47.39, 47.4, 47.41, 47.34; 297/344.21, 297/344.22
See application file for complete search history.

(56) References Cited

U.S. PATENT DOCUMENTS 4,518,139 A * 5/1985 Barfell .................. 248/418
4,681,340 A * 7/1987 Pasquini ................. 280/642
6,022,077 A * 2/2000 Kirkland et al. ....... 297/344.19
6,536,842 B2 * 3/2003 Bowers et al. ......... 297/344.22
2005/0242548 A1 * 11/2005 Hutchinson et al. ....... 280/642
2007/0052271 A1 * 3/2007 Lin et al. ............... 297/344.22

FOREIGN PATENT DOCUMENTS

EP  522783 A2 * 1/1993

* cited by examiner

*Primary Examiner*—Christopher P. Ellis
*Assistant Examiner*—John R. Olszewski

(57) ABSTRACT

A seat rotating device for a baby stroller includes a rotation unit connected to an underside of the seat and two insertions on two sides of an underside of the rotation unit are inserted into a positioning unit. The rotation unit has a disk and the seat is connected to the disk. The disk has a plurality of positioning holes defined in a periphery thereof. The disk is pivotably connected to a base by a shaft extending through a center of the disk and the base. The base has two wings and the two insertions are inserted into the wings. Each wing has a biasing member inserted therein which his connected with a cable. The biasing member is inserted into one of the positioning holes to position the disk and the seat at an angle.

10 Claims, 17 Drawing Sheets

SEAT ROTATING DEVICE FOR BABY STROLLERS

BACKGROUND OF THE INVENTION (1) Field of the Invention

The present invention relates to a seat rotating device for baby stroller and more particularly, the seat can be rotated desired angle.

(2) Description of the Prior Art

A conventional baby stroller generally includes a seat which is composed of a fabric and cushion pad. The seat is supported by links between the front wheels and rear wheels. The baby sitting in the seat of a conventional baby stroller can only face forward and if the baby is attracted by something located on one side of the stroller, he/she has to turn his/her head and twist his/her body. This usually causes the stroller to be tilt toward one side. If the baby wants to see something that he/she just passed by, the baby moves left and right and even extend his/her body out from the seat, the adult has to carefully control the stroller to avoid the stroller from fall aside. Although some baby stroller has rotatable seat which can be rotated the let the baby face forward or backward. One of the baby strollers is to switch the handle of the stroller from one end of the stroller to the opposite end, so that the direction of movement is reversed and the baby faces the opposite direction. Another of the baby strollers is to lift the seat and rotate the seat 180 degrees. Both of which require complicated processes and a lot of physical efforts. If the baby is sleeping, to lift the seat will wake the baby up.

The present invention intends to provide a seat rotating device for baby strollers wherein the seat can be positioned at different angles without disengaging any parts out from the stroller.

SUMMARY OF THE INVENTION

The present invention relates to a baby stroller that comprises two horizontal links, a handle, a pair of front wheel links, two extension links connected to the front wheel inks and two front wheels connected to the two extension links, a pair of sub-links pivotably connected to the handle, and a pair of rear wheel links with two rear wheels connected thereto. The two horizontal wheel links are pivotably connected between the rear wheel links and the sub-links. The extension links are crossly connected to the rear wheel inks. A first cable is connected to the front wheel links and a seat is located between the two horizontal links.

A rotation unit is connected to an underside of the seat and two insertions are connected on two sides of an underside of the rotation unit and inserted into a positioning unit. The rotation unit has a disk to which positioning rods of the seat are connected thereto. A plurality of positioning holes are defined in a periphery of the disk. A shaft extends through a center of the disk and a base. The base has two wings and the two insertions are inserted into the wings. Each wing has a biasing member inserted therein which is connected with a second cable. The biasing member is inserted into one of the positioning holes to position the disk and the seat at an angle.

The primary object of the present invention is to provide a baby stroller and the seat of the baby stroller can be easily rotated a desired angle.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
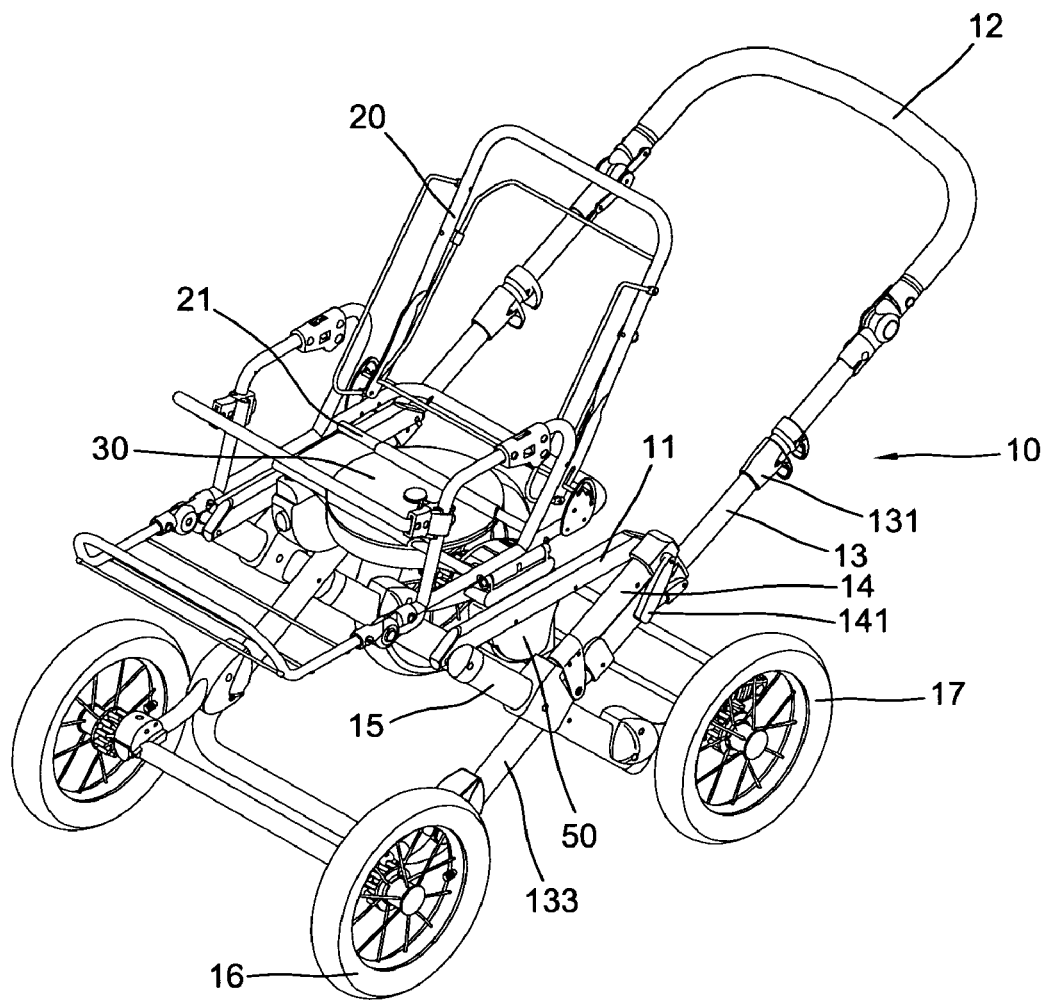
FIG. 1 is a perspective view to show the baby stroller of the present invention.
Figure 2:
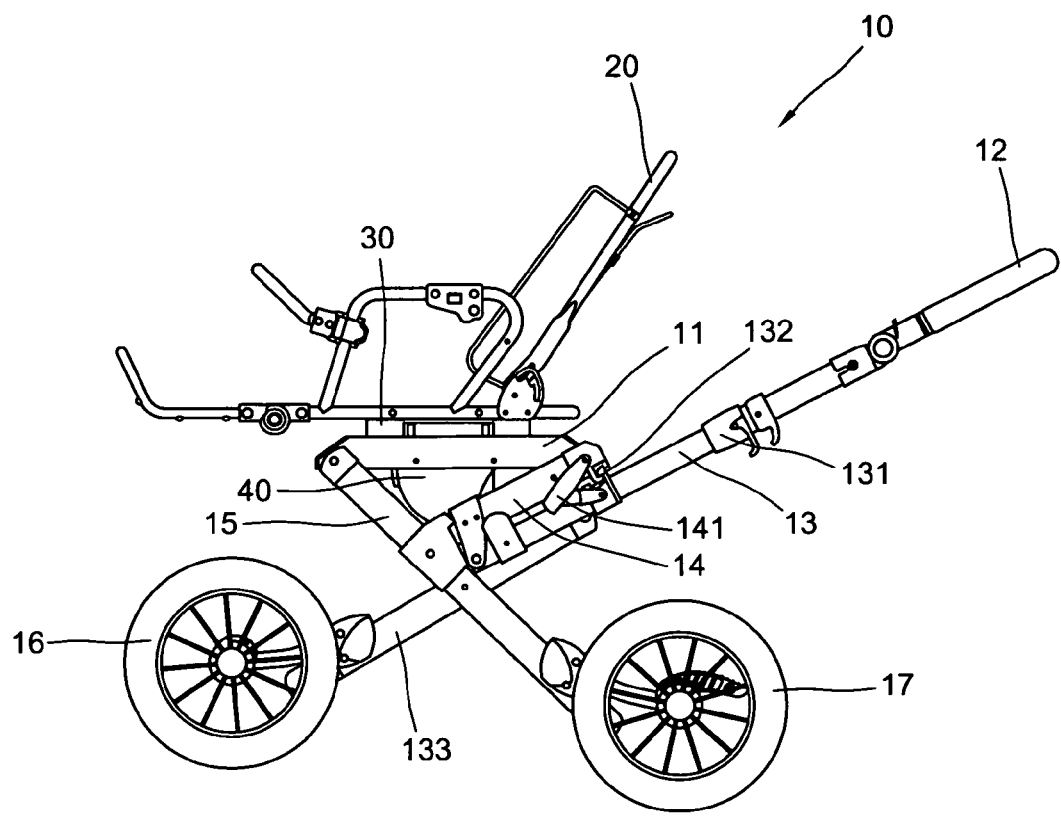
FIG. 2 is a side view to show the baby stroller of the present invention.
Figure 3:
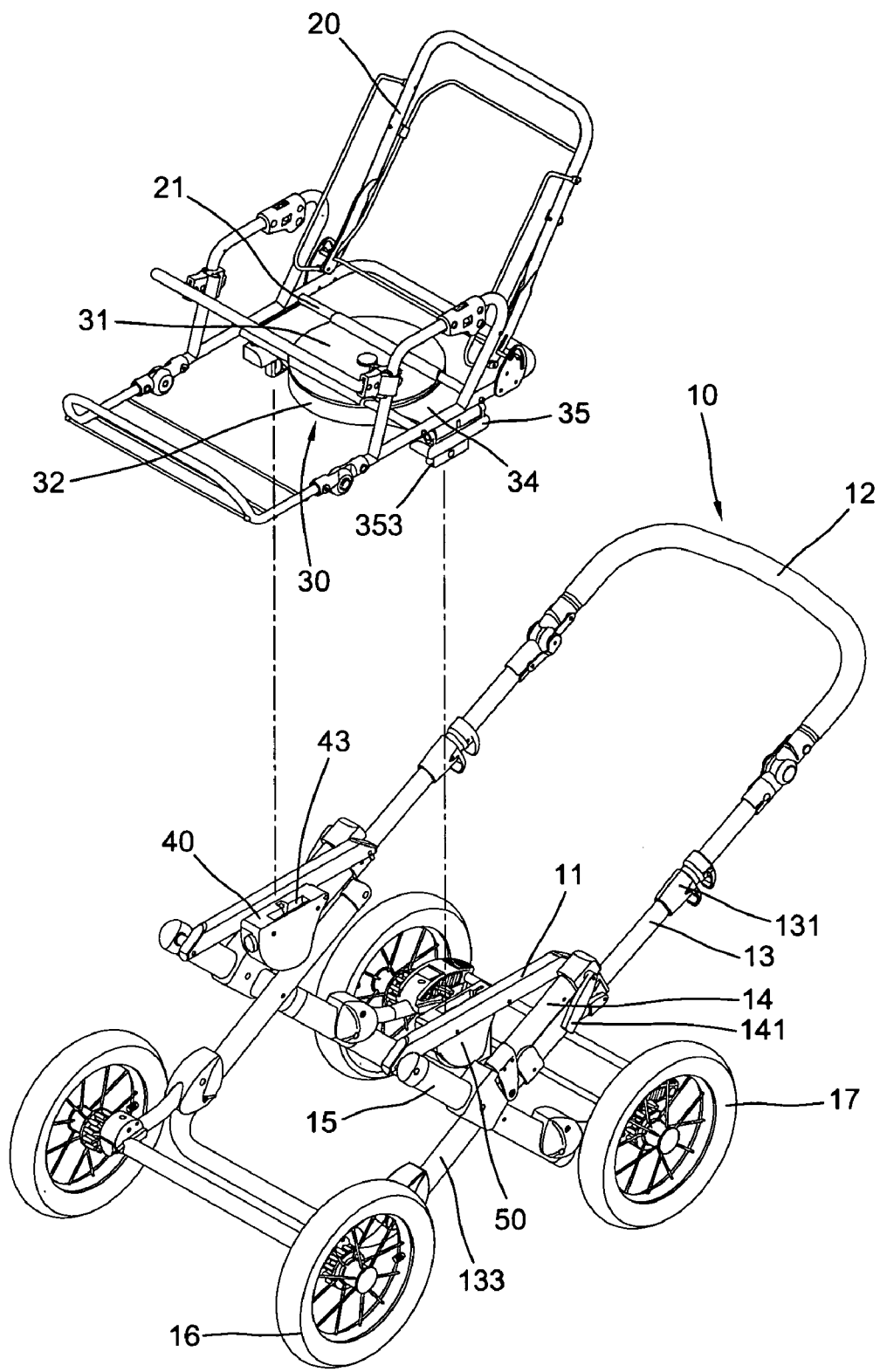
FIG. 3 is an exploded view to show seat and the frame of the baby stroller of the present invention.
Figure 4:
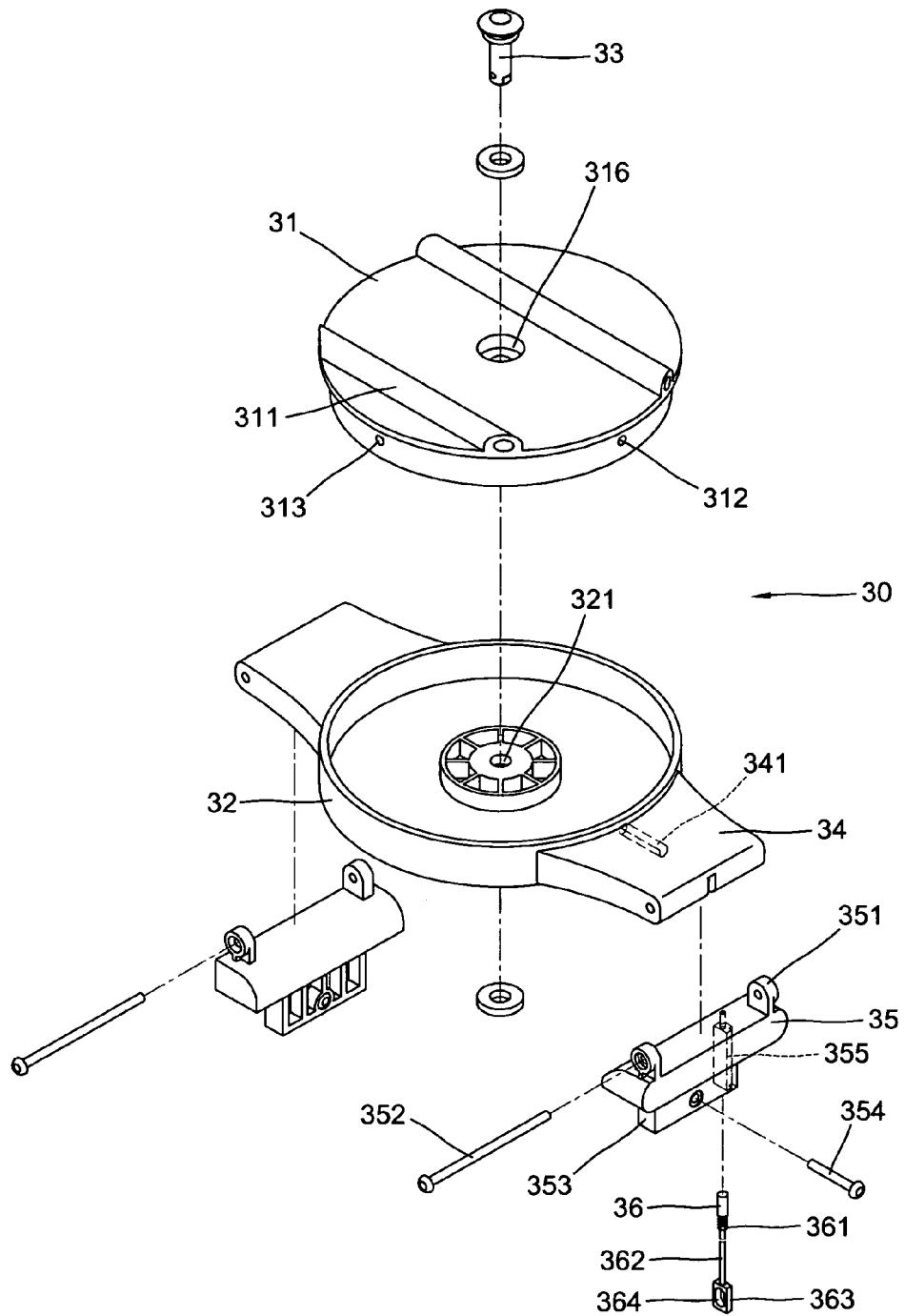
FIG. 4 is an exploded view to show the rotation unit of the baby stroller of the present invention.
Figure 5:
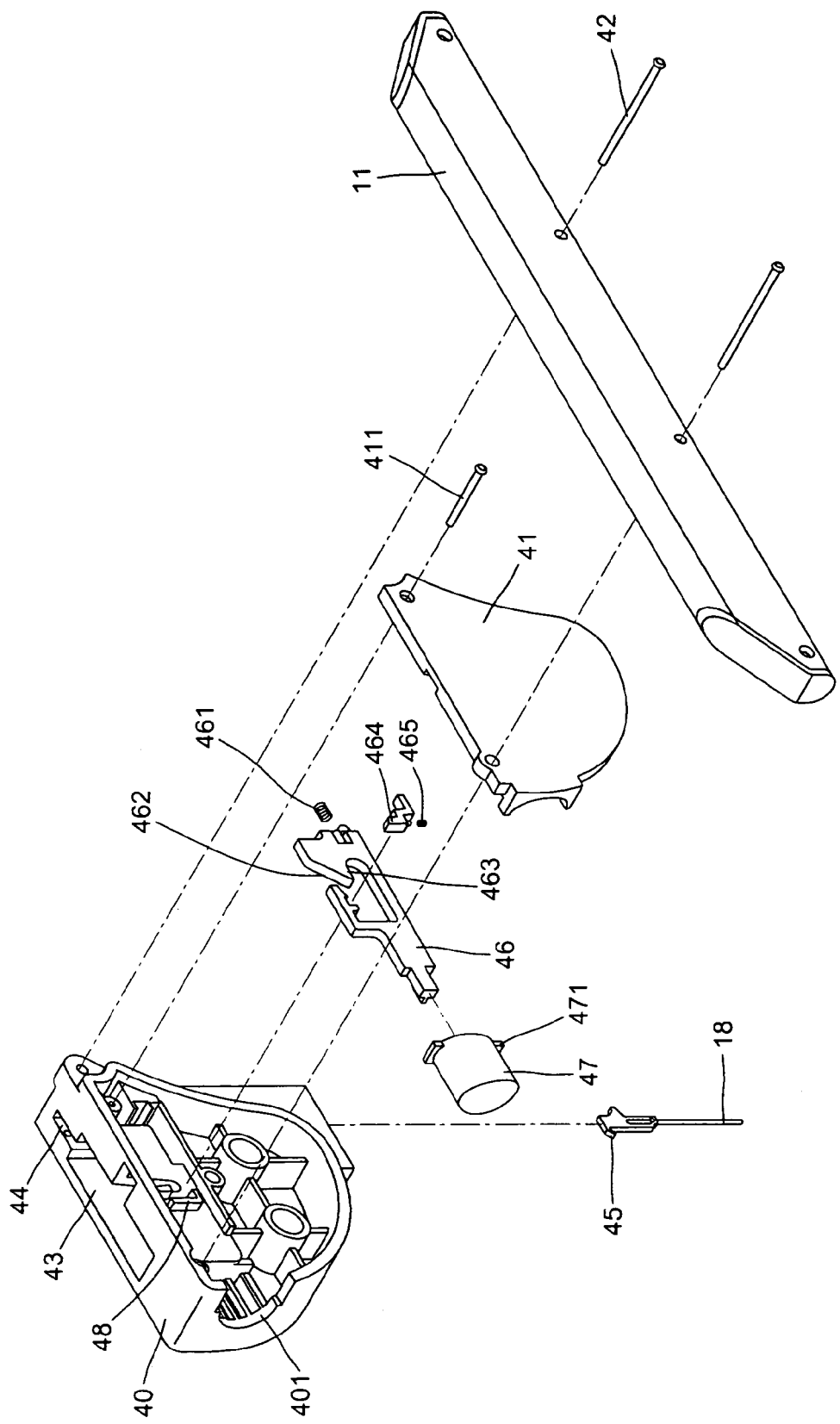
FIG. 5 is an exploded view to show the positioning unit of the baby stroller of the present invention.

Referring to FIGS. 1 to 5, the baby stroller 10 of the present invention comprises two horizontal links 11, a U-shaped handle 12, a pair of front wheel links 13, two extension links 133 connected to the front wheel inks 13, a pair of sub-links 14 pivotably connected to the handle 12 by two connection links 141, two front wheels 16 connected to the two extension links 133, and a pair of rear wheel links 15, two rear wheels 17 connected to the rear wheel links 15. The two horizontal wheel links 11 are pivotably connected between the rear wheel links 15 and the sub-links 14. The extension links 133 are crossly connected to the rear wheel inks 15. A first cable 18 is connected to the front wheel links 13 and a seat 20 composed of a plurality of rods is located between the two horizontal links 11. The above mentioned structure of the baby stroller 10 is similar to the conventional baby stroller.

Figure 6:
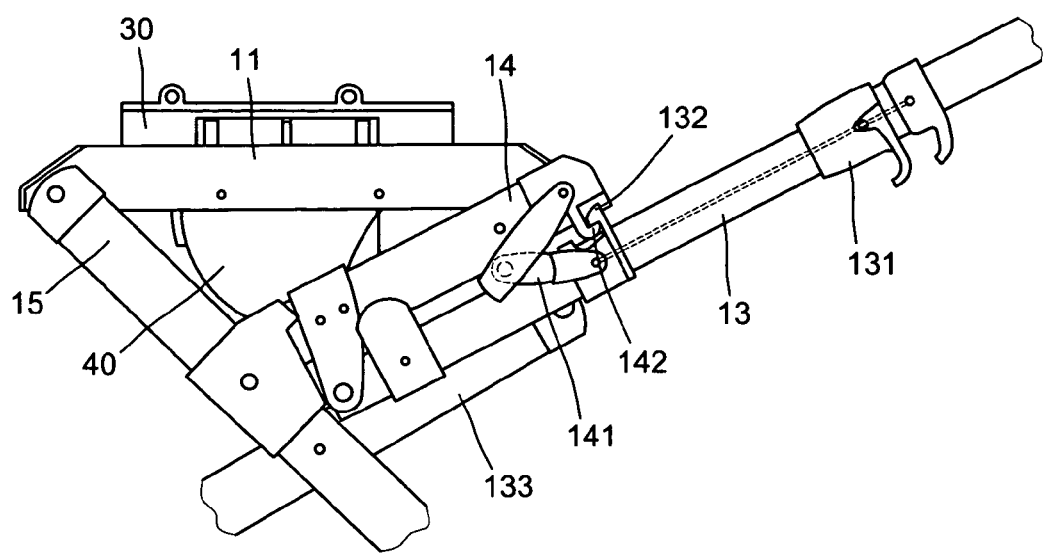
FIG. 6 shows that the second and third hooks are hooked with each other.
Figure 7:
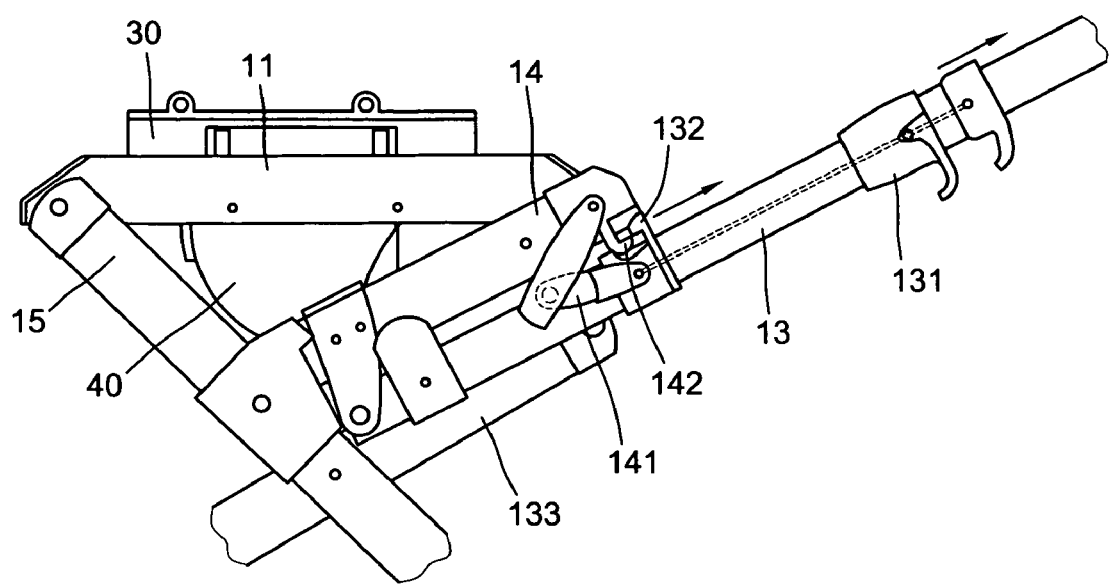
FIG. 7 shows that the second and third hooks are unhooked from each other.

The front wheel links 13 each have a sleeve 131 slidably mounted thereto and a second hook 132 is connected with the sleeve 131. The sub-links 14 each have a third hook 142 which is removably hooked to the second hook 132. The sleeve 131 and the second hook 132 are movable along the front wheel link 13 when the second and third hooks 132, 142 are disengaged from each other, the front wheel links 13 are pivoted an angle and pull the first cable 18 as shown in FIGS. 6 and 7.

Figure 10:
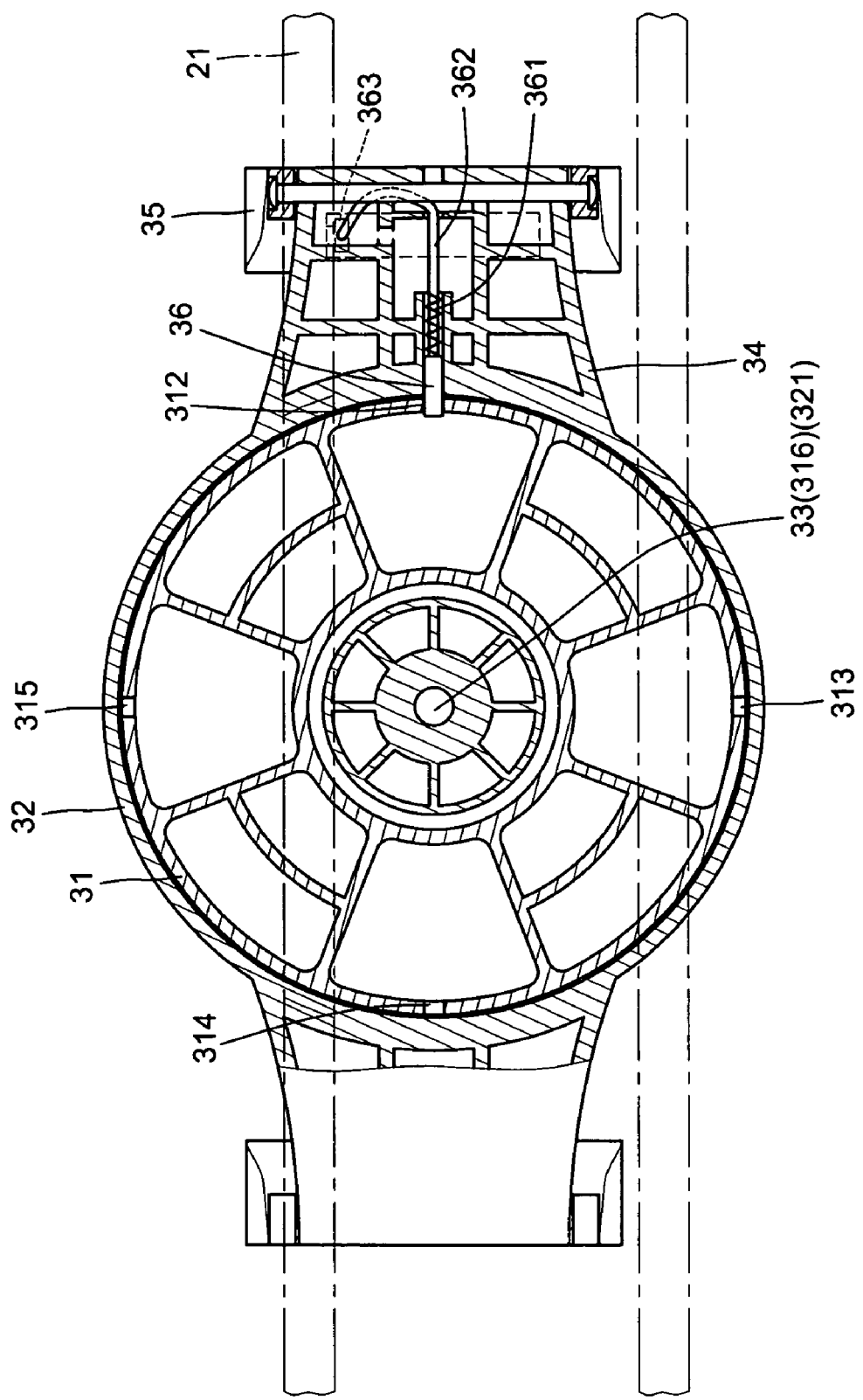
FIG. 10 is a cross sectional view to show that the disk is positioned by the protrusion.
Figure 11:
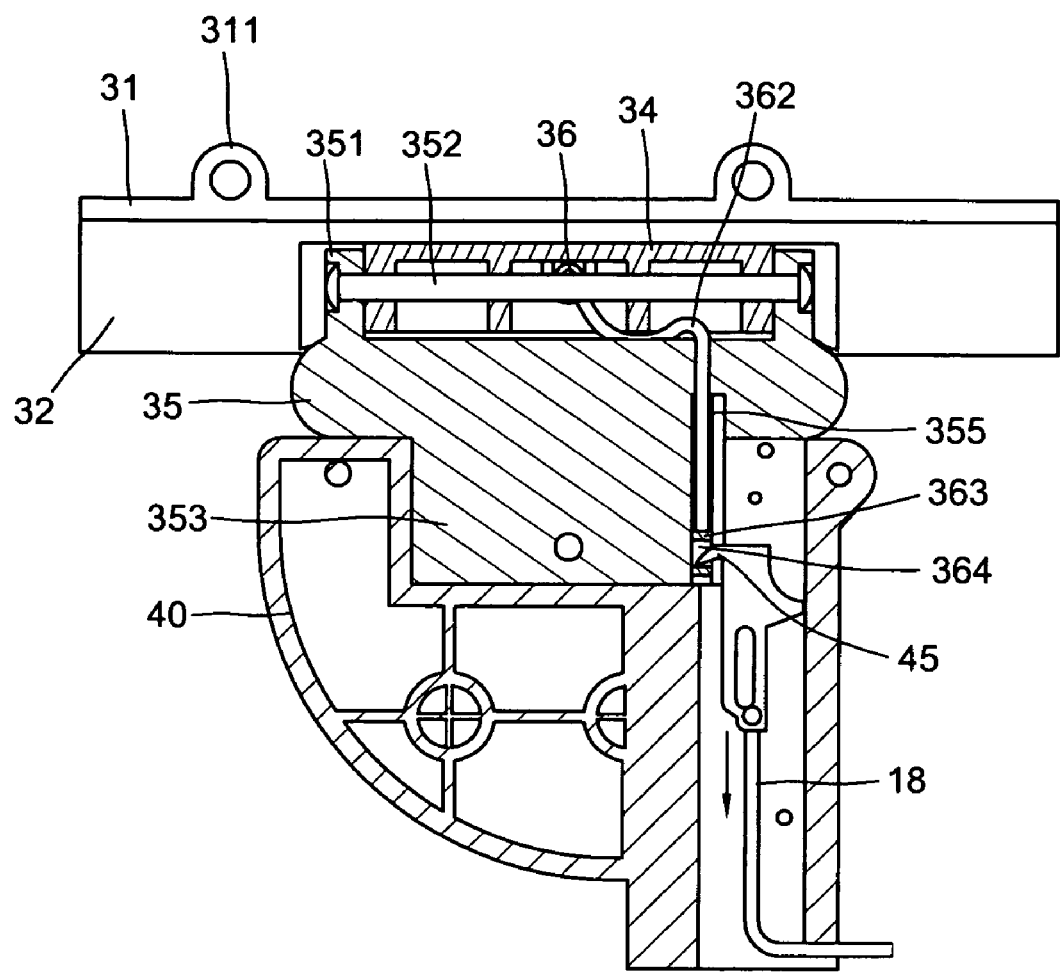
FIG. 11 shows that the ring member is pulled by pulling the cable.
Figure 12:
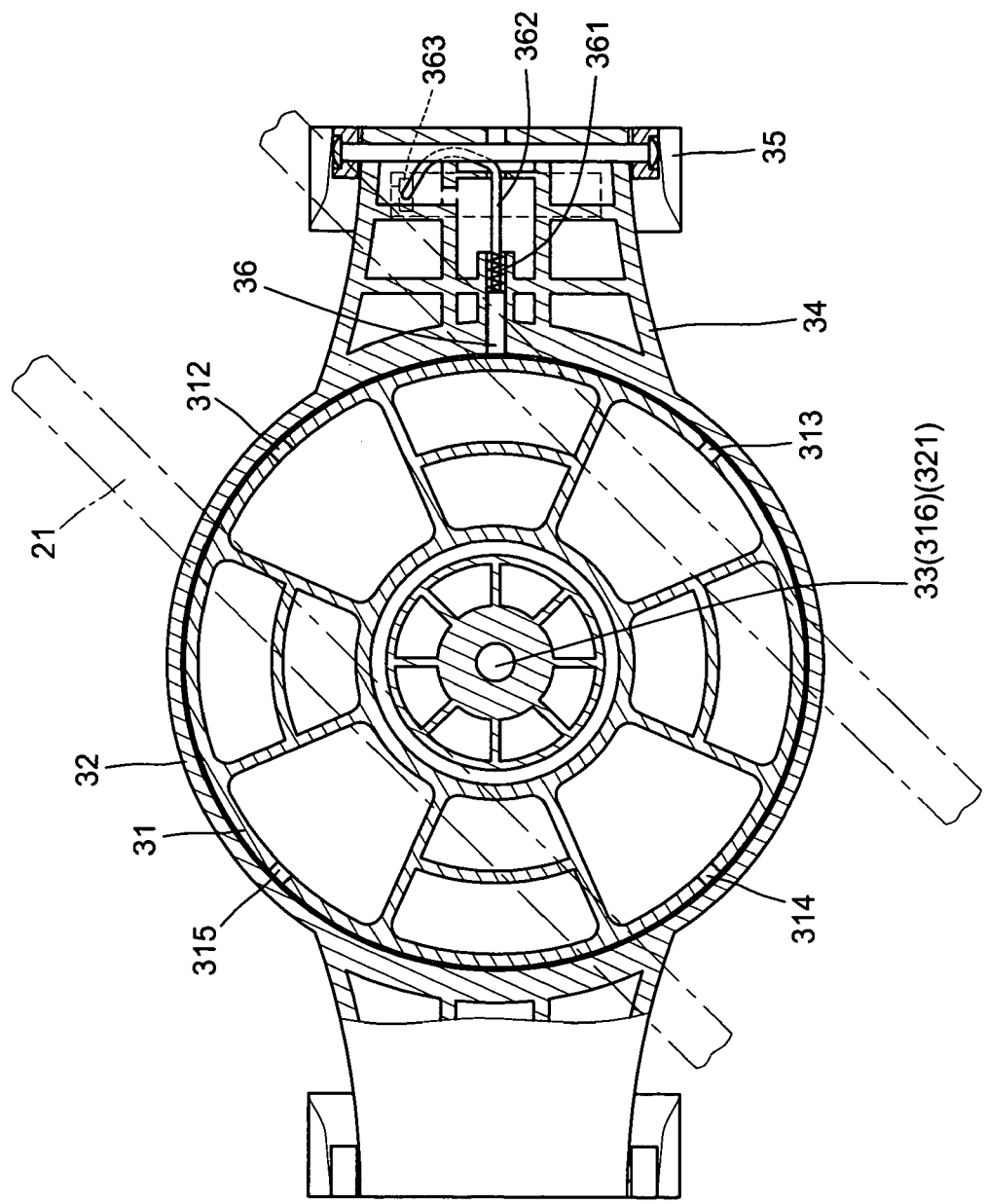
FIG. 12 shows that the disk is rotated an angle.
Figure 13:
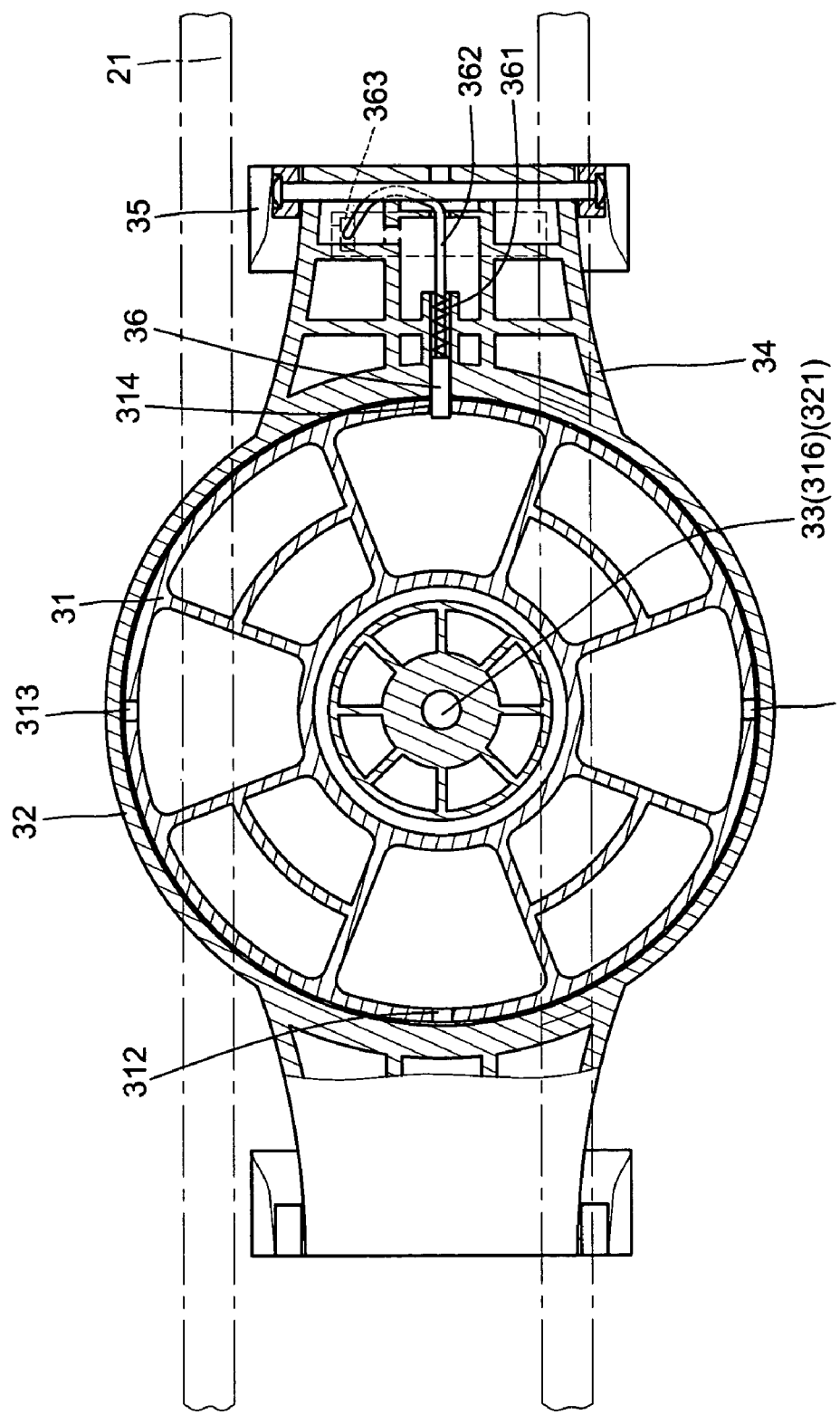
FIG. 13 shows that the disk is rotated 180 degrees.
Figure 14:
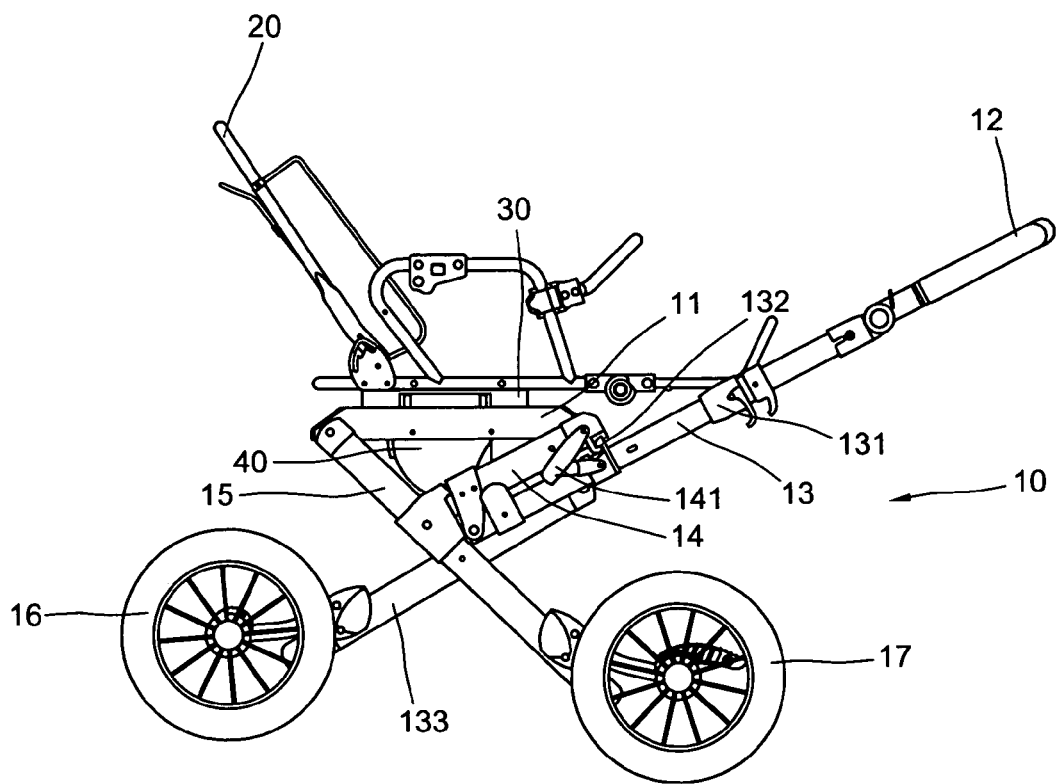
FIG. 14 shows that the seat is rotated 180 degrees.

A rotation unit 30 is connected to an underside of the seat 20 and two insertions 35 are connected on two sides of an underside of the rotation unit 30. The two insertions 35 are inserted into a positioning unit 40 which will be described later. The rotation unit 30 has a disk 31 which has a plurality of passages 311 defined in a top thereof and two positioning rods 21 of the seat 20 extend through the passages 311. A plurality of positioning holes 312, 313, 314, 315 as shown in FIG. 10 are defined in a periphery of the disk 31 and an angle of 90 degrees is defined between two any adjacent positioning holes 312, 313, 314, 315. The number of the positioning holes can be increased as desired.

A shaft 33 extends through a first center hole 316 in the disk 31 and a second center hole 321 in a base 32 so that the disk 31 can be rotatable about the shaft 33. The base 32 has two wings 34 and each of the insertions 35 has two lugs 351 so that the wing 34 of the base 32 is pivotably connected between the two lugs 351 by a pin 352. Each wing 34 has of the base 32 has a deep recess 341 and a biasing member 36 and a third spring 361 are received therein. The biasing member 36 is connected with a second cable 362. The biasing member 36 is inserted into one of the positioning holes 312, 313, 314, 315 to position the disk 31 and the seat 20 at an angle when adjusting the seat 20.

Each of the insertions 35 has a protrusion 353 extending from an underside thereof and the protrusion 353 is inserted into the positioning unit 40 and positioned by a positioning pin 354. A side recess 355 is defined in a side of each insertion 35 so as to receive a ring member 363 and the second cable 362. The second cable 362 has one end connected to the biasing member 36 and the other end of the second cable 362 is tied to a hole 364 of the ring member 363. The positioning unit 40 has a top hole 43 and a side hole 44 which communicates with the top hole 43. The protrusion 353 of the insertion 35 is inserted into the top hole 43 and the side hole 44 receives a first hook 45 and the first cable 18. The first hook 45 hooks the hole 364 of the ring member 363. A push board 46 is inserted into the positioning unit 40 and a button 47 is connected an end of the push board 46. The other end of the push board 46 is connected with a first spring 461. The button 47 has two stubs 471 and the positioning unit 40 has a side hole 401 to receive the stubs 471. The push board 46 includes an inclined surface 462 and a stop surface 463. A movable piece 464 is engaged with the push board 46 and biased by a second spring 465. The positioning unit 40 has a projection 48 against which the movable member 464 contacts. The positioning unit 40 has a cover 41 connected thereto by first rivets 411 and the positioning unit 40 is connected with the horizontal links 11 by second rivets 42.

Figure 8:
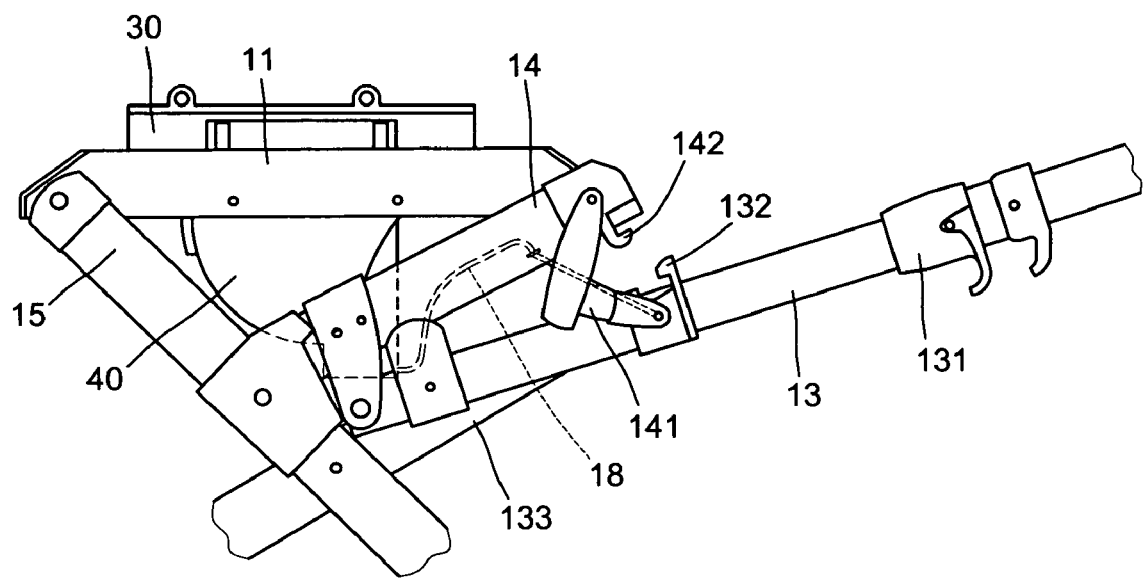
FIG. 8 shows that the front wheel link is pivoted and pulls the first cable.
Figure 9:
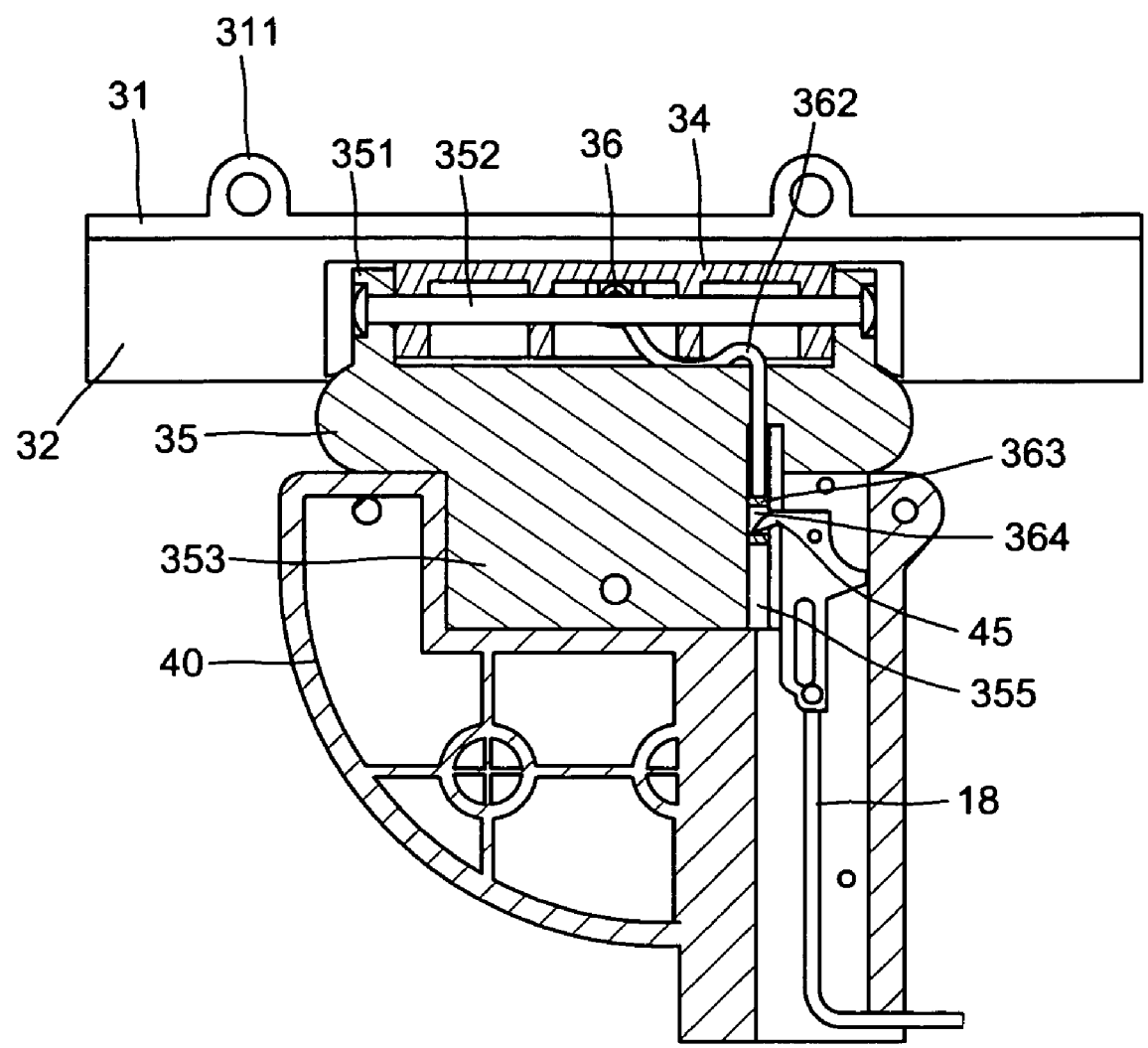
FIG. 9 is a cross sectional view to show the protrusion of the insertion is inserted into the positioning unit.

As shown in FIGS. 6 to 8, when adjusting the seat 20, the sleeves 131 are pulled upward to move the second hook 132 which pulls the first cable 18, or the first cable 18 can also be pulled by pivoting the front wheel link 13. As shown in FIGS. 9 to 14, the first cable 18 pulls the first hook 45 to move downward. The first hook 45 also pulls the ring member 363 downward and the cable 362 pulls the biasing member 36 of the base 32 so that the biasing member 36 of the base 32 moves backward. The biasing member 36 is removed from the positioning hole 312, so that the base 32 together with the seat 20 are rotatable. When the base 32 and the seat 20 are rotated to a desired angle, the sleeve 131 and the front wheel link 13 are pushed back to their original position by the spring therein and the first cable 18 is no longer pulled. The first hook 45, the ring member 363, the second cable 362 and the biasing member 36 are moved back to their original positions. The biasing member 36 is pulled back by the third spring 361. The biasing member 36 is then inserted into another positioning hole 314 so that the disk 31 and the seat 20 are positioned at a desired position.

The seat 20 can be positioned at desired angle depending one the positioning holes 312, 313, 314, 315. The seat 20 is not pulled out from the stroller 10 and the user simply shifts the sleeve 131 on the front wheel link 13 to unlock the rotation unit 30 to adjust the seat 20.

Figure 15:
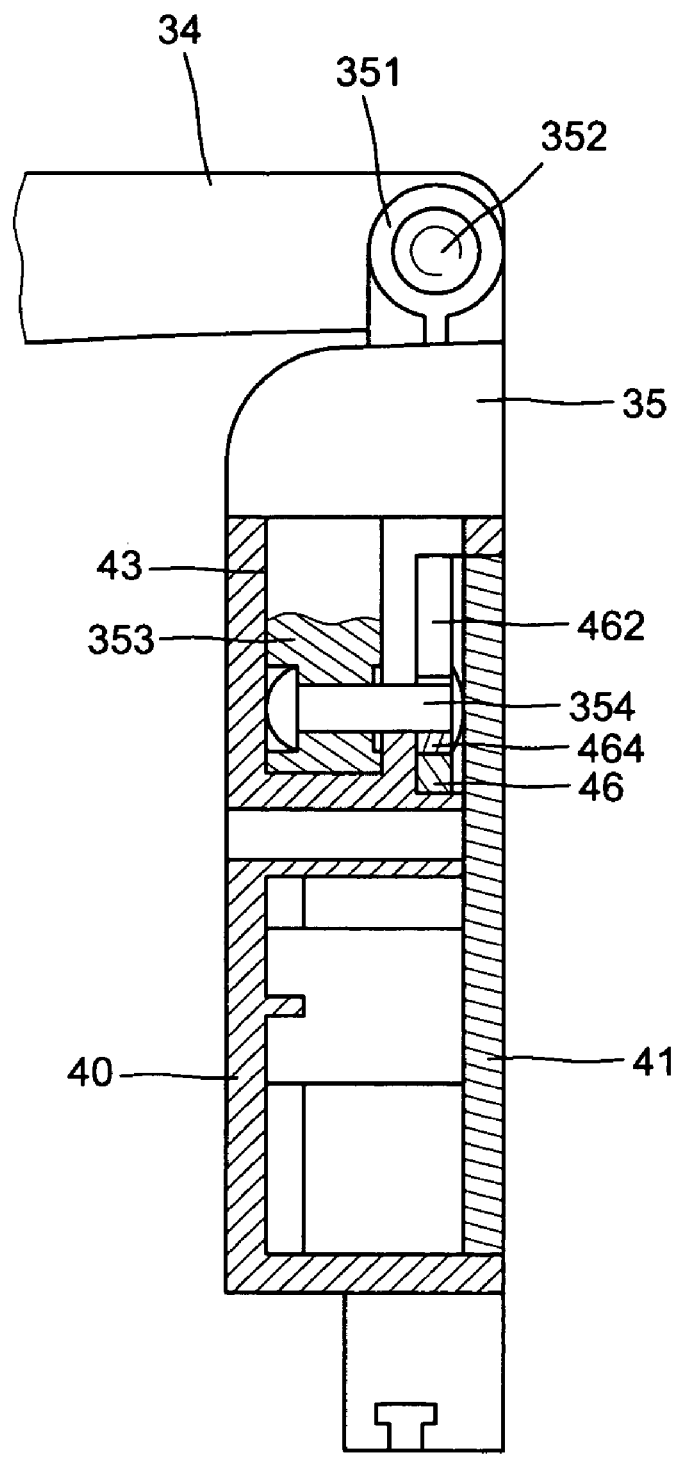
FIG. 15 shows that the insertion is inserted into the positioning unit.
Figure 16:
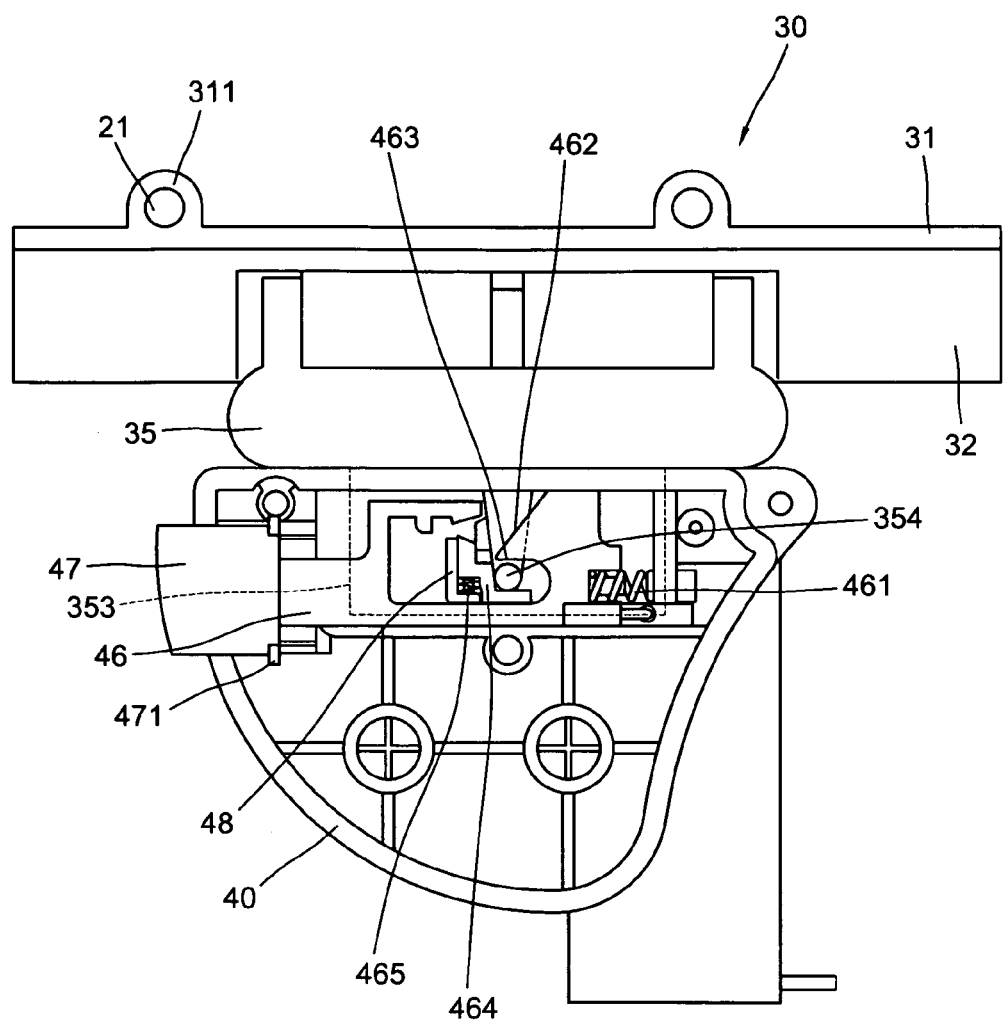
FIG. 16 is a side view to show that the insertion is inserted into the positioning unit.
Figure 17:
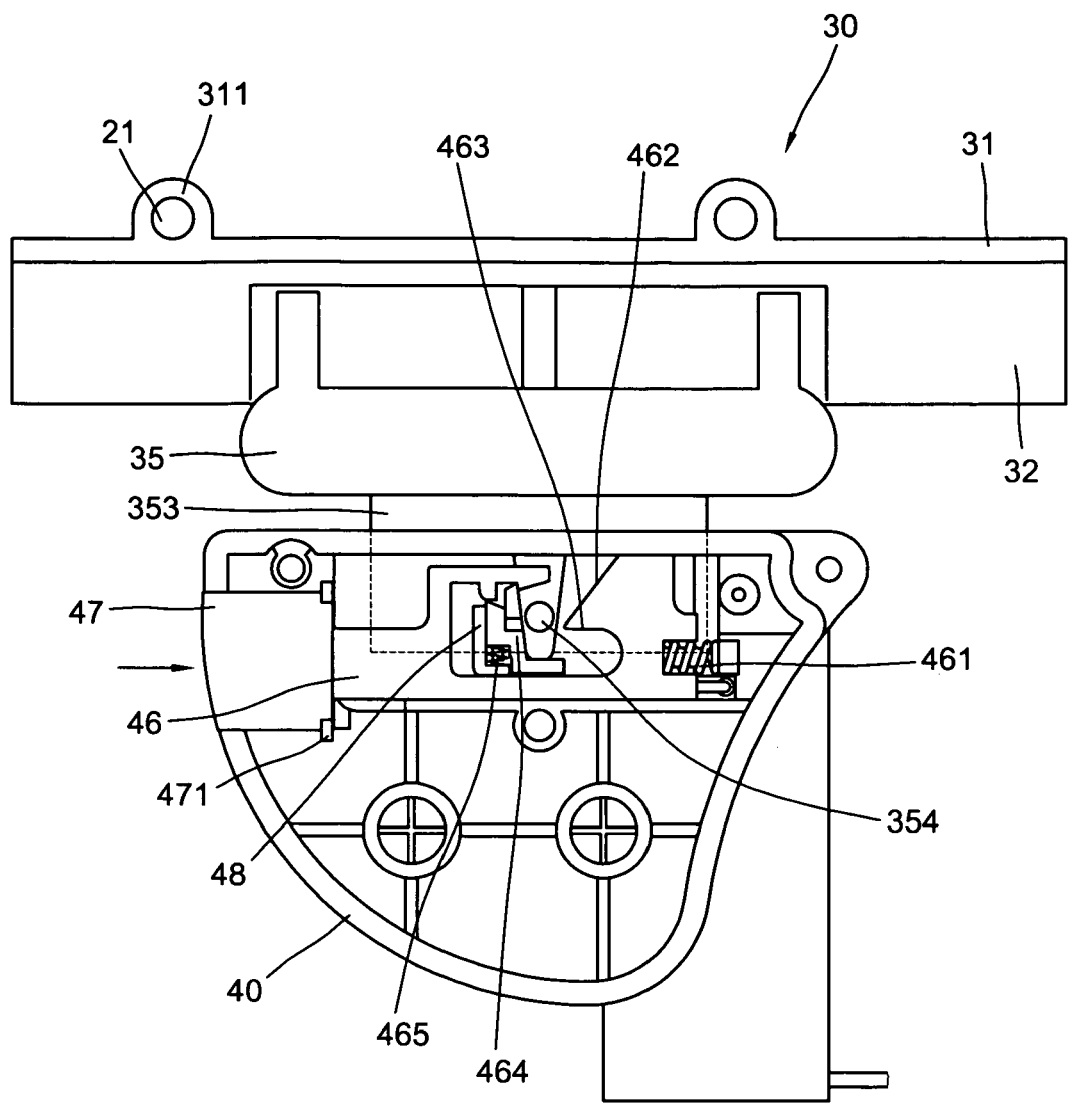
FIG. 17 shows that the button is pushed and the push board is shifted.

As shown in FIGS. 15 to 17, when pushing the button 47, the push board 46 is pushed backward and the stop surface 463 no longer stops the positioning pin 354 so that the positioning pin 354 is pushed upward by the movable piece 464 and can be quickly disengaged from the push board 46. The insertion 35 can then be removed from the top hole 43 of the positioning unit 40. The seat 20 is then easily removed from the stroller 10.

When the seat 20 is to be positioned in the stroller 10 again, the user inserts the protrusion 353 into the top hole 43, the positioning pin 354 of the protrusion 353 is then guided by the inclined surface 462 to push the push board 46. The positioning pin 354 is pushed into the push board 46 which is then positioned again by the first spring 461. The positioning pin 354 is stopped by the stop 463 and the protrusion 353 is inserted in the top hole 43 such that the base 32 and the seat 20 are positioned.

While we have shown and described the embodiment in accordance with the present invention, it should be clear to those skilled in the art that further embodiments may be made without departing from the scope of the present invention.

What is claimed is:

1. A baby stroller comprising:

two horizontal links, a handle, a pair of front wheel links, two extension links connected to the front wheel links, a pair of sub-links pivotably connected to the handle by two connection links, two front wheels connected to the two extension links, a pair of rear wheel links, two rear wheels connected to the rear wheel links, the two horizontal links pivotably connected between the rear links and the sub-links, the extension links crossly connected to the rear wheel links, a first cable connected to the front wheel links, a seat composed of a plurality of rods, and a rotation unit connected to an underside of the seat and two insertions connected on two sides of an underside of the rotation unit, the two insertions inserted into a positioning unit, the rotation unit having a disk and positioning rods of the seat connected to the disk, a plurality of positioning holes defined in a periphery of the disk, a shaft extending through a center of the disk and a base, the base having two wings and the two insertions pivotably connected to the wings, each wing having a biasing member inserted therein which is connected with a second cable, the biasing member inserted into one of the positioning holes to position the disk and the seat at an angle.

2. The baby stroller as claimed in claim 1, wherein the disk has a plurality of passages defined in a top thereof and the positioning rods of the seat extend through the passages.

3. The baby stroller as claimed in claim 1, wherein an angle of 90 degrees is defined between two any adjacent positioning holes.

4. The baby stroller as claimed in claim 1, each of the insertions has two lugs and the wing of the base are pivotably connected between the two lugs by a pin.

5. The baby stroller as claimed in claim 1, wherein each of the insertions has a protrusion extending from an underside thereof and the protrusion is inserted into the positioning unit and positioned by a positioning pin, a side recess is defined in a side of each insertion so as to receive a ring member and the second cable, the second cable has one end connected to the biasing member and the other end of the second cable is tied to a hole of the ring member, the positioning unit has a top hole and a side hole which communicates with the top hole, the protrusion of the insertion is inserted into the top hole and the side hole receives a first hook and the first cable, the first hook hooks the hole of the ring member, a push board is inserted into the positioning unit and a button is connected an end of the push board, the other end of the push board connected with a first spring, the push board includes an inclined surface and a stop surface, a movable piece is engaged with the push board and biased by a second spring, the positioning pin is slid into the push board via the inclined surface and stopped by the stop surface, when the push board is shifted aside, the positioning pin of the protrusion is pushed upward by the movable piece so that the protrusion is disengaged from the top hole.

6. The baby stroller as claimed in claim 1, wherein each wing of the base has a deep recess and the biasing member and a third spring are received therein.

7. The baby stroller as claimed in claim 5, wherein the button has two stubs and the positioning unit has a side hole to receive the stubs.

8. The baby stroller as claimed in claim 5, wherein the positioning unit has a projection against which the movable member contacts.

9. The baby stroller as claimed in claim 1, wherein the positioning unit has a cover connected thereto by first rivets and the positioning unit is connected with the horizontal links by second rivets.

10. The baby stroller as claimed in claim 1, wherein the front wheel links each have a sleeve slidably mounted thereto and a second hook is connected with the sleeve, the sub-links each have a third hook which is removably hooked to the second hook, the sleeve and the second hook are movable along the front wheel link when the second and third hooks are disengaged from each other, the front wheel links are pivoted an angle and pull the first cable.

* * * * *